United States Patent

Aoki

[11] 3,882,205
[45] May 6, 1975

[54] APPARATUS FOR DISSOLVING LARGE QUANTITIES OF OXYGEN IN WATER

[75] Inventor: Toyohiko Aoki, Tokyo, Japan

[73] Assignee: Naigai Kogyo Kabushiki Kaisha, Tokyo, Japan

[22] Filed: Apr. 15, 1974

[21] Appl. No.: 461,001

[52] U.S. Cl. .................................. 261/37; 261/89
[51] Int. Cl. .............................................. B01f 3/04
[58] Field of Search ........................ 261/89, 88, 37

[56] References Cited
UNITED STATES PATENTS

| | | | |
|---|---|---|---|
| 1,661,604 | 3/1928 | De Clairmont | 261/37 |
| 2,530,814 | 11/1950 | De Becze et al. | 261/37 |
| 3,011,769 | 12/1961 | Umbricht | 261/89 |
| 3,131,212 | 4/1964 | Biller | 261/88 |
| 3,299,621 | 1/1967 | Panzica et al. | 261/89 |

*Primary Examiner*—Tim R. Miles
*Assistant Examiner*—Gregory N. Clements
*Attorney, Agent, or Firm*—George B. Oujevolk

[57] ABSTRACT

An air-tight cistern is provided with a conduit for feeding water dissolving oxygen and with a conduit for controlling the water volume, a tank on the cistern and an inner vessel suspended from the tank and connected to the bottom of the tank. This tank has a perforated drum therein and has a dish for receiving water supported on a rotary shaft, and further the tank is provided with a conduit for feeding water into the perforated drum and a conduit for supplying oxygen thereinto. The water held in the dish is finely scattered by the dish being rotated at high speed in the drum, and the scattered fine water drops and oxygen are released into the tank across the perforations due to the centrifugal force caused by rotation of the drum, so as to provide a mixing action of the water and oxygen. Thus, water having a large volume of dissolved oxygen is prepared and stored in the air-tight cistern through the inner vessel, this water can then be supplied through the feeding conduit into the ponds, rivers or other places where the water is poor in oxygen.

3 Claims, 4 Drawing Figures

PATENTED MAY 6 1975

APPARATUS FOR DISSOLVING LARGE QUANTITIES OF OXYGEN IN WATER

BACKGROUND OF THE INVENTION

This invention relates to an apparatus for dissolving a large volume of oxygen in water.

BRIEF REVIEW OF THE STATE OF THE ART

Culture ponds, swamps, rivers or lakes for fish and shellfish are often polluted by foul water from factories, homes or other places and it is especially a serious problems to lower the oxygen content in water. Owing to lack of oxygen, water is rotten, causes trouble for living aquatic animals and difficulties for cultivators or fishermen, and methane produced by foul water accelerates pollution of the environment.

As a solution to the problem, oxygen should be supplied to the water where pollution begins or is begining. It has hitherto been the pratice to discharge clean water into polluted water but such a procedure requires considerable water with accompanying difficulties in storing clean water and transporting the water to the polluted places. On the other hand, oxygen supply apparatus can be installed near the pond, lake or other places and hoses are led there to supply oxygen through nozzles. However, this system only blows a large volume of oxygen which is not dissolved in the water and the gas rapidly goes up to the water surface and escapes into the atmosphere. Therefore, this system is not practicable for dissolving oxygen in the water.

A basic object of the invention is to remedy the shortcomings of the prior art practice in order to effectively dissolve oxygen by means of a relatively simple structure. Generally speaking, a hollow perforated drum is placed in a tank. Into this tank there is inserted an end of an oxygen supplying conduit, while a dish for receiving the water is disposed under the drum. This dish is funnel-shaped and corrugated and disposed coaxially with the drum. A tubular water-feeding pipe is attached at an upper part of the drum and is formed with a plurality of openings facing the center of the dish so that water and oxygen are separately fed to the perforated drum and the water held in the dish is scattered finely by the dish which is rotated at high speed within the drum so that the centrifugal force causes the scattered water drops and oxygen to contact each other at almost equivalent speed and to pass through the perforations of the drum. In this way, both the water and oxygen are subjected to a mixing action outside of the drum. The water dissolves the oxygen in the fine water drops and hold the oxygen for a long period of time, i.e., the thus treated water and oxygen are in contact with each other by the centrifugal force of the drum. The oxygen volume in the water is about 7.99 ppm at a water temperature of 26°C, but by the arrangement herein described oxygen content may be increased to 26ppm or more.

Therefore, by the present inventive concept it is possible to fully dissolve oxygen in water and to supply the oxygen rich water into lakes, swamps, rivers or other bodies of water lacking in oxygen. In such case, the tank having the perforated drum therein is placed in an air-tight cistern so that communication is provided through the bottom thereof. A pump is provided on this cistern for successively feeding the water into the tubular pipe in the tank so as to provide the above mentioned scattering of the water and mixture of water-oxygen. Within the air-tight cistern, the inner vessel suspends from the tank for storing the oxygen-dissolving water in the inner vessel and flowing it into the cistern. A conduit for feeding water is inserted in the lower part of the cistern in such a manner that an end portion thereof opens at an appropriate water surface in the cistern for controlling the water volume.

Accordingly, by using the invention it is possible to efficiently prepare the water by having a comparatively low volume of oxygen dissolving therein a high volume of oxygen and to safely carry out such an operation. In this case, the perforated drum is rotatably supported in the tank and the water receiving dish is furnished in the drum to scatter the water finely, and the centrifugal force is made use of to provide the mixing action of the water and oxygen. Feed means are provided in the perforated vessel under the drum to which feed means a pipe opens for exhausting extra oxygen, and this pipe is led outside to yield excess oxygen and to avoid explosion which could happen because of excess pressure.

Other objects and advantages of the invention will be apparent from the following detailed explanation with reference to the accompanying drawings in which:

DETAILED DESCRIPTION

Figure 1:
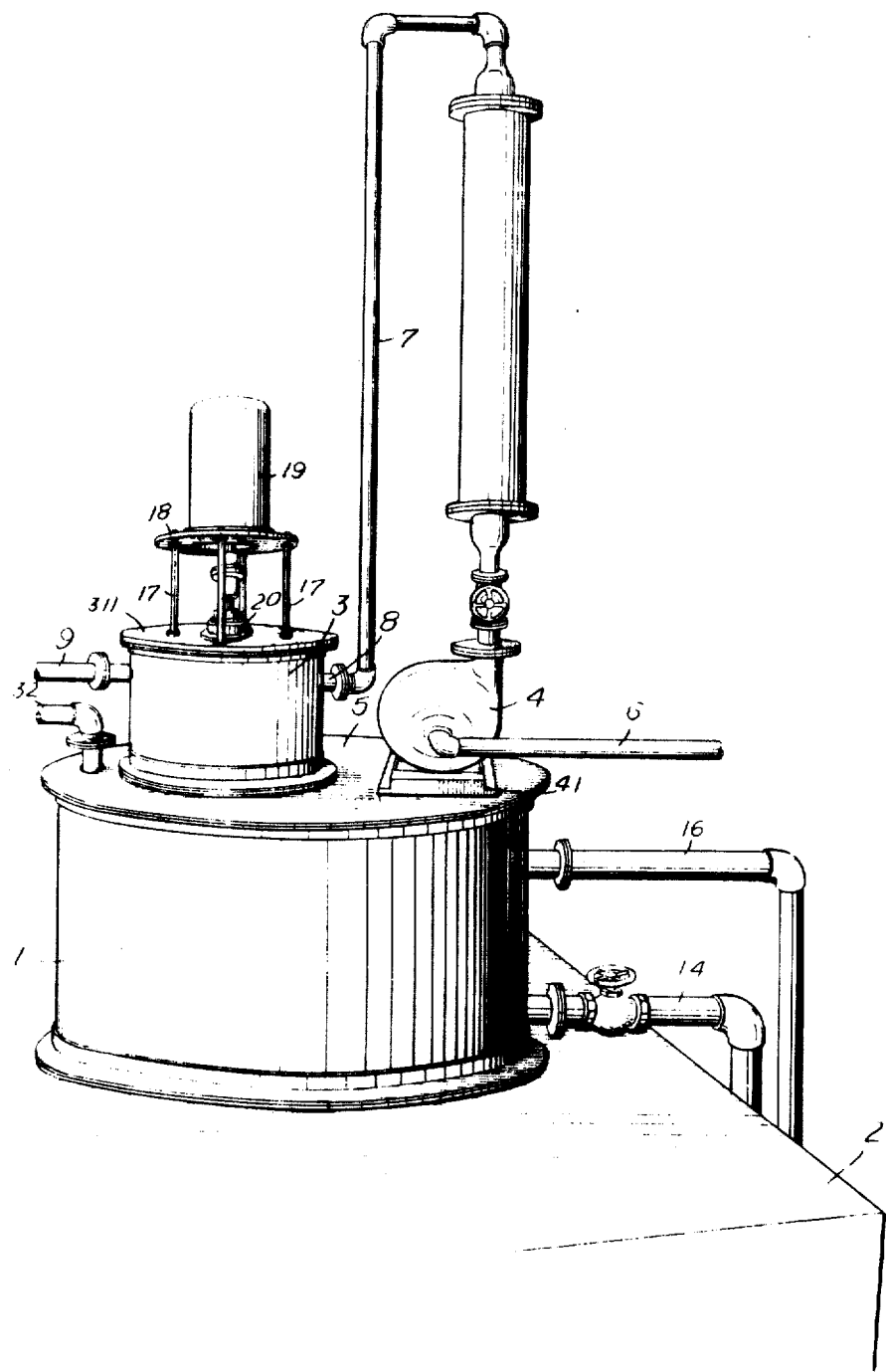
FIG. 1 is an exterior view of an apparatus for dissolving oxygen in water according to the inventive concept.

The invention will be explained with reference to the accompanying drawings. An air-tight cistern built to hold a large volume of water is installed on a base 2 near or around pond, rivers, lakes, swamps or other bodies of water where the water is to be supplied with oxygen. On a cover 5 of the cistern is a cylindrical tank 3. In parallel to the tank 3 is hydraulic pump 4, on a cover 5 of the cistern 1 with a base 41. This pump 4 is connected at one end to a conduit 6 for feeding water from water sources to water sources, industrial water, or ponds, lakes, swamps, etc. into which oxygen is supplied, and further it is also connected at another end to a conduit 7 which is bent to effect the desired pressure. This conduit 7 leads to a pipe 8 inserted in the cylindrical tank 3. Oxygen is supplied by an oxygen-supplying conduit 9 connected to an oxygen source or air compresser (not shown) and it is connected to an oxygen supply line 10 within the tank 3.

Figure 2:
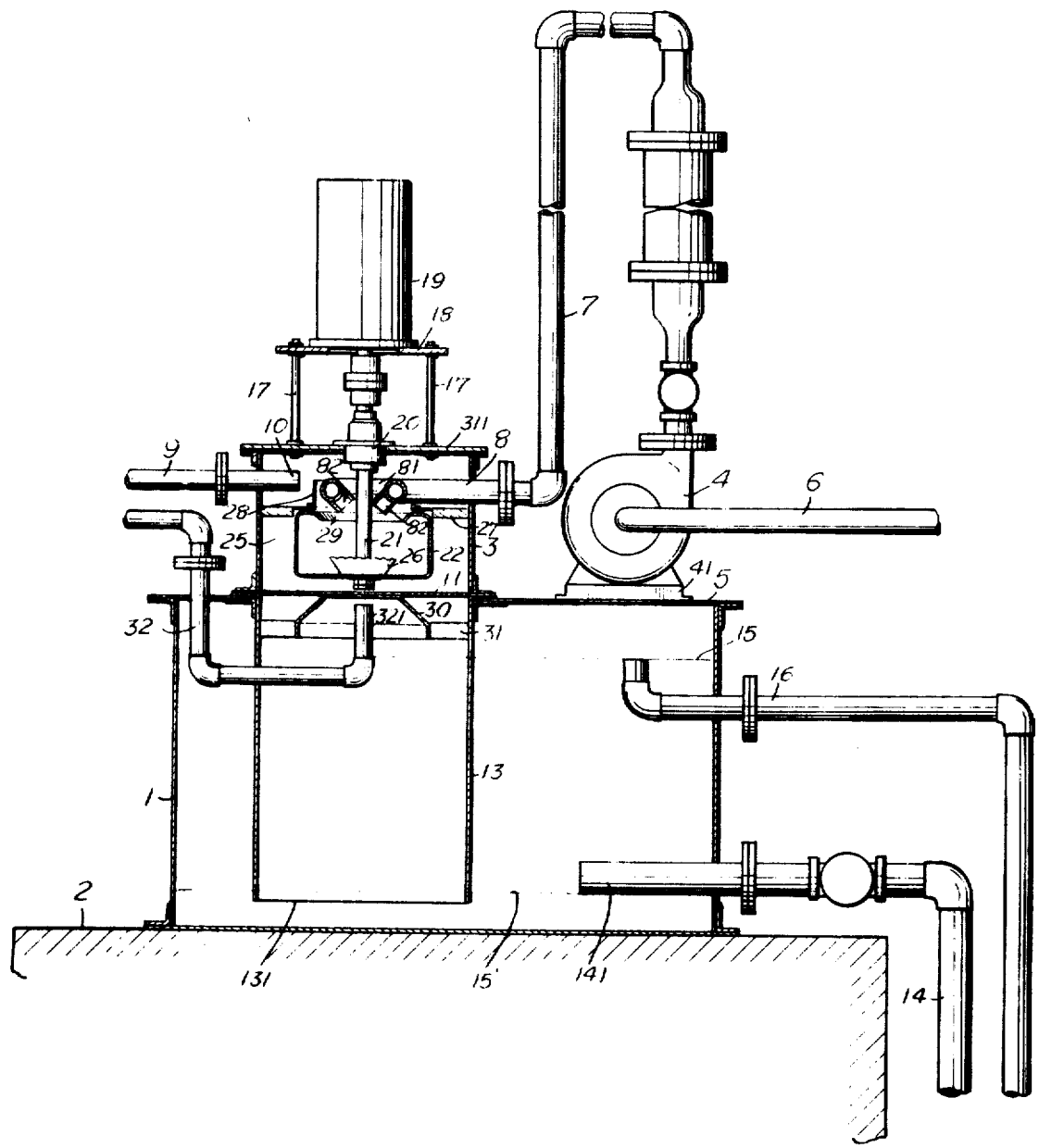
FIG. 2 is a longitudinal partially cross-sectional view of the above.
Figure 3:
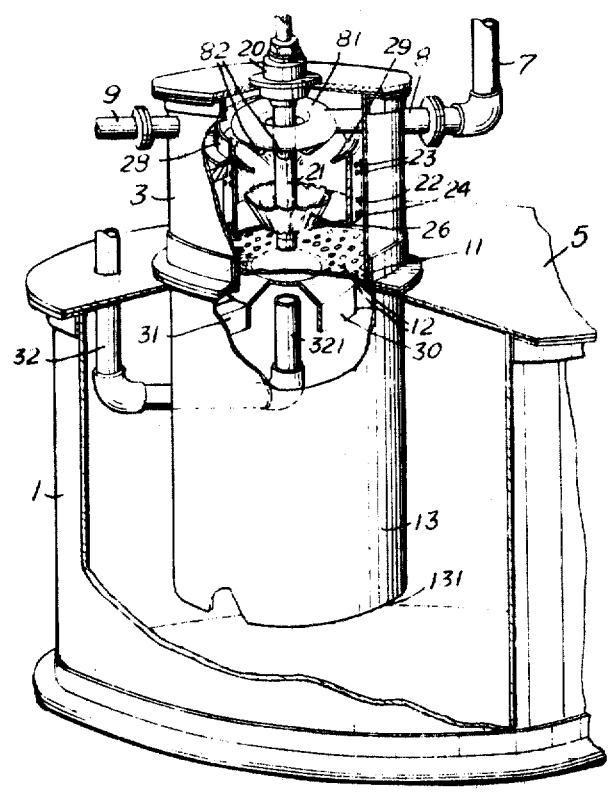
FIG. 3 is a prespective view, partially in section, of a part of an oxygen-mixing mechanism in FIG. 2; and, FIG. 4 is a perspective view of a rotary drum mechanism shown in FIG. 3.

FIGS. 2 and 3 show cross sectional structure of the apparatus of FIG. 1. The tank 3 is provided with a partition 11 almost at the same level as the cover 5 to divide the tank 3 and the inside of the air tight cistern 1. This partition 11 is as shown in FIG. 3, and has a multiplicity of perforations 12 which communicate to the inside of the cistern 1. In the cistern 1, an inner vessel 13 whose lower end is open is suspended from the partition 11, the diameter thereof being almost equal to that of the tank 3 and being concentric therewith. In this connection, at the lower part of the cistern 1 a conduit 14 for feeding the oxygen dissolving water into ponds, swamps, lakes, etc. (not shown) is inserted in such a manner that an end portion 14 thereof is a little higher than the level of a lower opening 131 of the inner tube 13. Thus, when the oxygen dissolving water is least (at a level indicated with 15' in FIG. 2) the lower opening 131 is in the water. Further, a conduit 16 is inserted in the cistern 1 in such a manner that an end portion thereof opens at an appropriate water surface 15 in the cistern 1 for controlling the water volume. This conduit 16 also leads to the ponds, lakes, etc.

Figure 4:
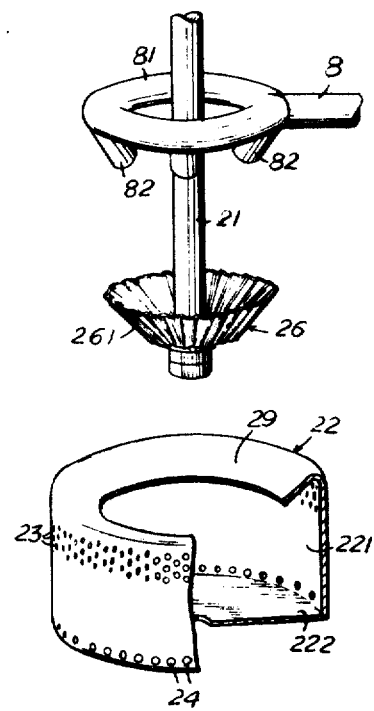

FIGS. 2 and 4 show an oxygen-mixing mechanism used herein. On an upper part of the tank 3 is a cover 311 over which a support 18 stands on a plurality of poles 17 and a motor 19 is disposed on the support. A lid 311 of the tank 3 is provided with a shaft coupling 20 at a position corresponding to the center of the tank 3 and this shaft coupling 20 connects an output shaft of the motor 19 to a rotary shaft 21. This rotary shaft 21 extends through the center of the tank 3 just above the partition 11, and a drum 22 is disposed concentrically to the shaft 21. The drum 22 has an upper and lower part, the diameter of the latter being larger. The upper part has perforations 23 and 24. The space 25 between the circumference 221 and the drum 3 is predetermined so that fine water drops and oxygen passing through the perforations 23 and 24 are mixed there. A funnel-shaped water receiving dish 26 is disposed concentrically to the rotary shaft 21 at the lower part 222 of the perforated drum 22, this dish is flared upwardly and has corrugations 261 as shown in FIG. 4. In the tank 3 higher than the perforated drum 22 a circular feed 28 is disposed and held by a supporting member 27 having an opening 29 at the upper part of the perforated drum 22 by inwardly bending and slanting the upper part of the perforated drum 22. The water feeding pipe 8 is inserted in the circular feed 28 to feed the water into the drum 22, and the feeding mechanism consists of a circular tube 81 at the end of the pipe 8 with a plurality of spouts slanting towards the rotary shaft 21, preferably to the center of the dish 26. In the inner vessel 13 suspended from the air tight cistern 1 there is also an oxygen collection hood 30 connected to the partition 11 held by brace 31 extending from the inner vessel 13. Within an oxygen collection hood 30, an end 321 of a pipe 32 for exhausting extra oxygen opens. This pipe 32 is introduced into the inner vessel 13 through the cistern 1 from the outside. The extra oxygen falling down through the tank 3 and perforations 12 of the partition 11 is fed back to the oxygen source or released into the atmosphere.

OPERATION OF THE INVENTION

The motor 19 rotates the rotary shaft 21 via the rotary coupling 20 at high speed, so as to rotate the perforated drum 22 disposed on this rotary shaft 21 and also the water receiving dish 26 at the bottom of the drum 22. Oxygen is fed under pressure to the oxygen-supplying conduit 9 from the oxygen source, or a valve (not shown) of the conduit 9 is opened and the pump 4 operates. Thus, oxygen is flown into the tank 3 from the oxygen supply 10 through oxygen-supplying conduit 9 and it further flows into drum 22 from the circular feed 28 within the tank 3 through the opening 29 of the drum 22, while the water is brought into pump 4 from water-supplying conduit 6 and supplied under pressure into the circular tube 81 within the tank 3 from pump 4 through water-supplying conduit 7 and the water-feeding pipe 8. It is further fed under pressure into the perforated drum 22 from the plural spouts 82 arranged around the circular tube 81. The water just after leaving the spouts 82 crosses the diameter of tube 81 and collides with the corrugation 261 of the dish 26 which is rotated with the drum 22 so that it is finely divided and scattered in the drum from the funnel-shaped circumference of the dish 26. Similarly, oxygen flows off dish 26 on running into the drum 22. The fine water drops and oxygen are mixed in the drum 22 and are released outside through the perforations 23, 24 due to the centrifugal force of the drum 22 rotated at high speed, and at this time the water is once again finely divided. The water and oxygen passing through the perforations 23, 24 are mixed instantly in the circular space 25 between the circumference 221 and the tank 3. Since the water to dissolve oxygen is, then, fine drops, its surface area (oxygen contacting area) is very large, and since it is in the form of fine drops the dropping speed is lowered proportionately. This mixing with oxygen continuously takes place and consequently dissolves the maximum volume of oxygen.

The water drops containing oxygen dissolved therein fall through space 25 to the partition 11, from perforations 12 and go into the inner vessel 13 within the cistern. The same operation is repeated with the water and oxygen so that water with a large volume of oxygen therein is stored in the inner vessel 13 and the air tight cistern 1. The stored water is kept so that the water level is always above the level of a lower opening 131 of the inner vessel 13, and is then discharged into the rivers, ponds, swamps or lakes poor in oxygen. In this way the foul water is rapidly purified by supplying three or four times the average volume of oxygen in water. In this connection, when water having a high oxygen volume is stored in more than the predetermined amount, the extra water is exhausted through a conduit 16 for controlling the water volume. On the other hand, extra oxygen in the tank 3 goes into the inner vessel 13 from the circular space 25 through the perforations 12 of the partition 11, and is captured into pipe 21 for discharging extra oxygen to the atmosphere.

I claim:

1. An oxygen-dissolving apparatus comprising in combination:
   a. an air-tight cistern (1);
   b. a tank (3) on said cistern;
   c. an elongated inner vessel (13) in said cistern (1) under said tank (3) with a perforated partition (11) between said tank (3) and said inner vessel (13), said inner vessel being concentric with said tank (3) within the cistern (1), said inner vessel having a lower opening (131);
   d. a rotary shaft (21) disposed perpendicularly in said tank (3) with a perforated drum (22) around said shaft at an upper part of which an opening (29) is formed and at a lower part of which a water receiving dish (26) is disposed;
   e. a conduit (9) leading into said tank (3) for supplying oxygen into said drum (22), a water-supplying pipe (8) leading into said tank and a pump (4) for supplying water into said tank;
   f. a circular part (81) above said opening (29) at the end of said pipe (8) around which circular part (81) a plurality of spouts (82) are disposed for discharging water towards said dish (26);
   g. a feeding conduit (14) at a lower part of said cistern (1) with an end (141) thereof a little above said lower opening (131) and a conduit (16) for controlling the discharge of water supplied to said dish (26) from the spouts (82), wherein water is finely divided by the dish rotated by said rotary shaft at high speed so that fine drops are formed while oxygen is released into a circular space (25) between an outer circumference of said drum (22) and an inner circumference of the tank (3) through perforations (23) (24) due to the centrifugal force of the drum (22) being rotated at high speed so that water and oxygen mixing takes place continuously dissolving a large volume of oxygen into the water which is received in the inner vessel (13) through the perforations of said partition (11) and is stored in the air tight cistern (1) through the lower opening of the inner vessel (13) for discharging into oxygen-poor water.

2. An apparatus set forth in claim 1, in which the dish (26) in the drum (22) is of funnel shape, upwardly flared and corrugated.

3. An apparatus set forth in claim 1, in which an oxygen collection hood (30) is disposed in the inner vessel (13), an upper part thereof being in contact with the partition (11), to which opens an end portion (321) of a conduit (32) for discharging extra oxygen from the tank (3).

* * * * *